US009272355B2

(12) United States Patent
Stanzel et al.

(10) Patent No.: US 9,272,355 B2
(45) Date of Patent: Mar. 1, 2016

(54) HYDRAULICALLY DRIVEN DUAL OPERATOR WELDING SYSTEM AND METHOD

(75) Inventors: David A. Stanzel, Appleton, WI (US); David Edwin Radtke, New London, WI (US); Michael W. Roth, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 759 days.

(21) Appl. No.: 12/966,944

(22) Filed: Dec. 13, 2010

(65) Prior Publication Data

US 2011/0174791 A1 Jul. 21, 2011

Related U.S. Application Data

(60) Provisional application No. 61/295,808, filed on Jan. 18, 2010.

(51) Int. Cl.
B23K 9/10 (2006.01)
(52) U.S. Cl.
CPC .................................. *B23K 9/1006* (2013.01)
(58) Field of Classification Search
CPC ... B23K 2201/26; B23K 9/0026; B23K 9/038
USPC ................ 219/54–60 A, 70, 78.01, 101–116, 219/130.1–133, 137 PS
See application file for complete search history.

(56) References Cited

U.S. PATENT DOCUMENTS

| 3,277,567 | A | * | 10/1966 | Rieppel et al. | ................ 228/168 |
| 6,087,626 | A | | 7/2000 | Hutchison et al. | |
| 6,166,349 | A | | 12/2000 | Williams et al. | |
| 6,909,067 | B2 | | 6/2005 | Davidson et al. | |
| 2001/0032830 | A1 | | 10/2001 | McCormick | |
| 2002/0043409 | A1 | | 4/2002 | Parkert | |
| 2008/0061045 | A1 | * | 3/2008 | Eldridge | .................... 219/130.1 |
| 2009/0218327 | A1 | * | 9/2009 | Beeson | .......................... 219/133 |
| 2010/0155372 | A1 | * | 6/2010 | Battisti et al. | .................... 219/55 |

FOREIGN PATENT DOCUMENTS

| WO | 2008067252 | | 6/2008 |
| WO | 2009108247 | A1 | 9/2009 |

OTHER PUBLICATIONS

International Search Report for application No. PCT/US2011/021384 mailed May 2, 2011.

* cited by examiner

*Primary Examiner* — Tu B Hoang
*Assistant Examiner* — Thomas Ward
(74) *Attorney, Agent, or Firm* — Fletcher Yoder P.C.

(57) ABSTRACT

Welding systems including a hydraulically driven welding power supply adapted to utilize hydraulic primary power to generate a first welding output for a first welding operation and a second welding output for a second welding operation are provided. Such welding systems may include control circuitry coupled to the hydraulically driven welding power supply and adapted to enable the hydraulically driven welding power supply to provide the first welding output and the second welding output at the same time to enable a first welding operator and a second welding operator to perform the first welding operation and the second welding operation, respectively, at the same time.

12 Claims, 5 Drawing Sheets

HYDRAULICALLY DRIVEN DUAL OPERATOR WELDING SYSTEM AND METHOD

CROSS REFERENCE TO RELATED APPLICATIONS

This application is a Non-Provisional Patent Application of U.S. Provisional Patent Application No. 61/295,808 entitled "Pipe Welding Process", filed Jan. 18, 2010, which is herein incorporated by reference in its entirety.

BACKGROUND

The invention relates generally to welding power supplies and, more particularly, to hydraulically driven welding power supplies configured for use by dual operators.

Welding is a process that has become increasingly ubiquitous in various industries and applications. For example, welding processes are employed in construction, manufacturing, shipbuilding, and so forth. For further example, pipe welding processes may be performed to join two pieces of pipe into one larger unit or to repair existing pipes that may have degraded over time. Since the pipes being welding in such processes often have long lengths, multiple welders are often needed to perform a desired weld along a single pipe length. Additionally, since the diameters of such pipes may also be large, it is often desirable to perform multiple welding operations at different spots along the length and around the circumference of the pipes. Unfortunately, many traditional welding systems only support a single welding operation at one time and, accordingly, multiple welders are needed to weld a single pipe. Additionally, such welders often operate by drawing substantial amounts of power from a primary electrical power source, thereby decreasing the system efficiency. Accordingly, there exists a need for improved welding systems that overcome such drawbacks.

BRIEF DESCRIPTION

In an exemplary embodiment, a welding system includes a hydraulically driven welding power supply adapted to utilize hydraulic primary power to generate a first welding output for a first welding operation and a second welding output for a second welding operation. The welding system also includes control circuitry coupled to the hydraulically driven welding power supply and adapted to enable the hydraulically driven welding power supply to provide the first welding output and the second welding output at the same time to enable a first welding operator and a second welding operator to perform the first welding operation and the second welding operation, respectively, at the same time.

In another embodiment, a welding system includes a hydraulically driven welding power supply adapted to produce a first power output capable of being utilized in a first welding operation and a second power output capable of being used in a second welding operation. The welding system also includes a controller coupled to the hydraulically driven welding power supply and adapted to control the hydraulically driven welding power supply to exclusively activate the first power output, to exclusively activate the second power output, or to concurrently activate both the first power output and the second power output.

In another embodiment, a system includes a hydraulically driven welding power source. The hydraulically driven welding power source includes a first generator adapted to receive hydraulic power and to convert the hydraulic power to a first electrical power output to enable a first welding operator to perform a first welding operation. The hydraulically driven welding power source also includes a second generator adapted to receive hydraulic power and to convert the hydraulic power to a second electrical power output to enable a second welding operator to perform a second welding operation, distinct from the first welding operation, at the same time as the first welding operation.

DRAWINGS

These and other features, aspects, and advantages of the present invention will become better understood when the following detailed description is read with reference to the accompanying drawings in which like characters represent like parts throughout the drawings, wherein.

Figure 5:
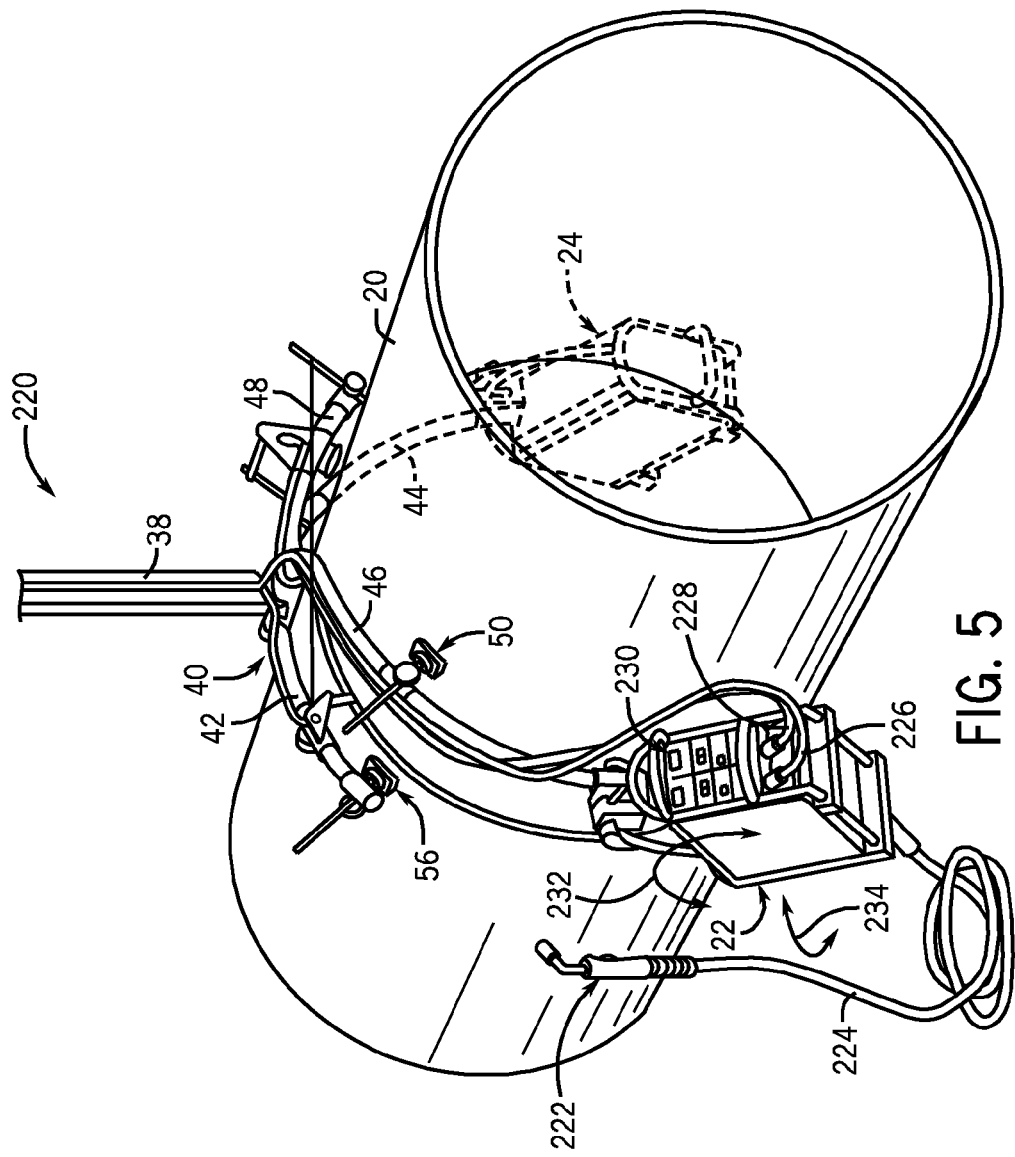
Figure 6:
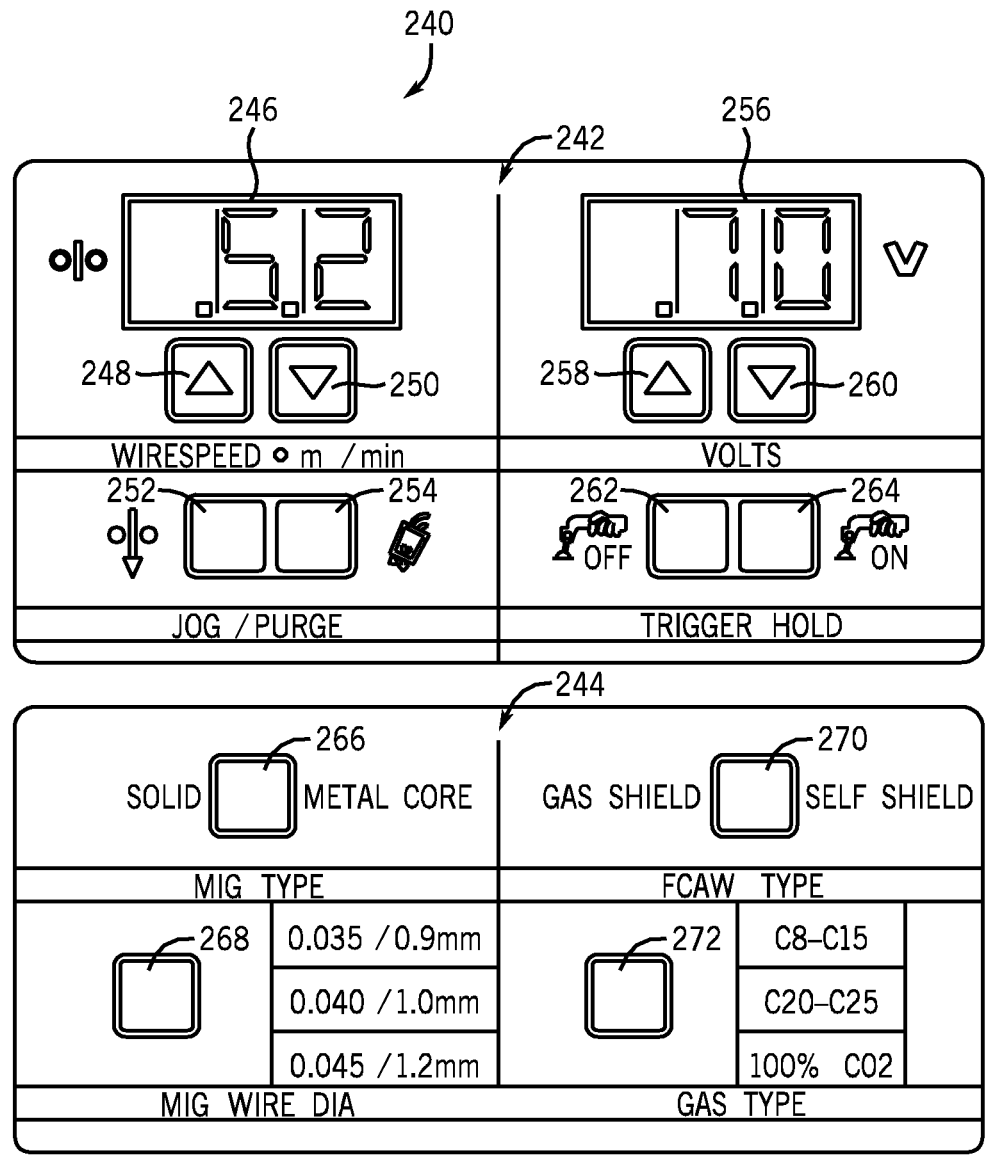

FIG. 5 illustrates an exemplary pipe welding system including an exemplary semicircular frame structure positioned on a pipe and configured to support dual wire feeders for dual welding operations in accordance with aspects of the present invention; and FIG. 6 illustrates an exemplary control panel that may be located on one or more of the wire feeders of FIG. 5 in accordance with embodiments of the present invention.

DETAILED DESCRIPTION

As described in detail below, embodiments of a welding system including a hydraulically driven welding power supply configured as a dual operator system are provided. As such, the hydraulically driven welding power supply is capable of producing two welding outputs for two distinct welding operations at the same time. Accordingly, two welding operators may concurrently perform two separate welding operations, each having a distinct welding arc, wire feed, welding parameters, and so forth. The foregoing feature may offer advantages over traditional systems that are configured for use by a single operator or may not utilize hydraulic power. For example, in one embodiment, the hydraulic power already provided (e.g., by an associated work vehicle) in the work environment may be utilized to power the dual operations. For further example, the two welding operations may not only be powered by the same power source, but such operations may also be performed cooperatively on the same workpiece (e.g., a pipe), thus increasing the efficiency of the overall welding operation.

Further, in some embodiments, the welding power supply is adapted to receive hydraulic power from a hydraulic system located in a work vehicle (e.g., a tractor) and to utilize such hydraulic power to power one or more motors in the welding power supply. For example, in one embodiment, a single hydraulic motor may be coupled to two distinct generators each configured to provide power for a distinct welding operation. For further example, in another embodiment, two separate hydraulic motors coupled to two respective generators may receive the hydraulic power from the hydraulic system in the work vehicle and generate two distinct power outputs, which may be utilized at the same time. As compared to traditional systems, such features may increase the efficiency of the welding systems disclosed herein because the hydraulic power, which is already generated by the work vehicle during, for example, pipe welding processes, is utilized to power the associated welding operations.

Figure 1:
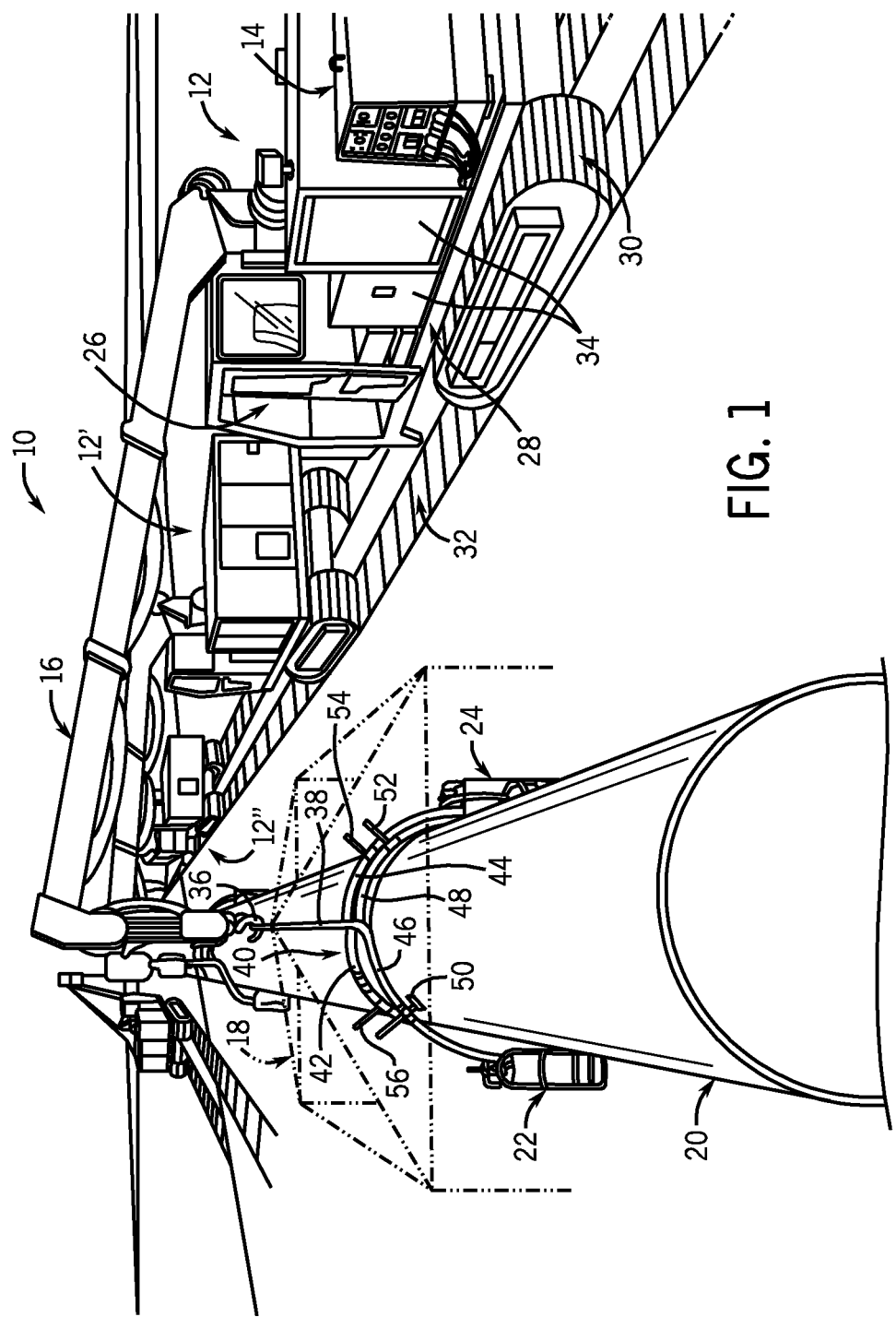
FIG. 1 illustrates an exemplary pipe welding system configured to perform a pipe welding process in accordance with embodiments of the present invention.

Turning now to the drawings, FIG. 1 illustrates an exemplary pipe welding system 10 configured to perform a pipe welding process. It should be noted, however, that embodiments of the presently disclosed hydraulically driven, dual operator welding power supplies may be utilized in any suitable welding process, and, thus, embodiments of the present invention are not limited to a pipe welding process. In the illustrated embodiment, the pipe welding system 10 includes a hydraulic equipped work vehicle 12, a hydraulically driven dual operator welding power supply 14, a crane 16, a canopy 18, a pipe 20, and wire feeders 22 and 24. The work vehicle 12 includes an operator cabin 26, a base portion 28, and treads 30, which may generate a track 32 during operation. Work supplies 34 are disposed on the base portion 28 alongside the dual operator welding power source 14. The crane 16 also extends from the base portion 28 of the work vehicle 12 to the weld location. The crane 16 terminates in a hook 36 extending above the pipe 20 in the illustrated embodiment. As shown, an extension 38 hangs from the hook 36 and couples the crane 16 to a semicircular support frame 40. The semicircular support frame 40 includes semicircular bars 42, 44, 46, and 48. The semicircular bars 42, 44, 46, and 48 include adjustable feet 50, 52, 54, and 56 that adjust to stabilize the frame 40 based on the size of the pipe 20. The semicircular bars 44 and 46 terminate in the first wire feeder 22 and the second wire feeder 24, respectively.

It should be noted that the pipe welding system 10 shown in FIG. 1 includes multiple welding stations that are substantially identical to the previously described station. That is, additional work vehicles 12' and 12" support additional welding operations along the length of the pipe 20. For example, the work vehicle 12" may support the root pass portion of the pipe welding process, the work vehicle 12' may support the fill pass portion of the process, and the work vehicle 12 may support the cap pass portion of the pipe welding process. After a given process is completed at a given location along the length of the pipe 20, the work vehicles 12, 12', and 12" may be moved along the track 32 to perform their respective processes on the next appropriate area of the pipe 20. Accordingly, as before, additional hydraulically driven welding power supplies 14 configured for use in dual operator welding operations are disposed on the work vehicles 12' and 12" and are coupled to the hydraulics of such work vehicles. Again, it should also be noted that such hydraulically driven welding power supplies 14 configured for dual operator use may be utilized in any of a variety of welding operations, which may or may not be related to pipe welding.

During operation, at the first illustrated station supported by work vehicle 12, the hydraulically driven welding power supply 14 is configured to provide power for both a first welding operation performed with a first welding torch plugged into the first wire feeder 22 as well as a second welding operation performed with a second welding torch plugged into the second wire feeder 24. To provide such power, the welding power supply 14 is configured to receive hydraulic power from a hydraulic system disposed in the work vehicle 12. That is, the dual operator welding power supply 14 is configured to utilize the hydraulic power already generated by the work vehicle 12 to support the vehicle operation. As such, the hydraulically driven welding power supply 14 does not necessarily include a standalone hydraulic system. Indeed, in many embodiments, the welding power supply 14 may not include such a standalone system and, accordingly, may be dependent upon the work vehicle 12 as a source of primary power. Nevertheless, the welding power supply 14 utilizes hydraulic power to produce two distinct welding outputs, which may be utilized concurrently to perform two separate welding operations.

Figure 2:
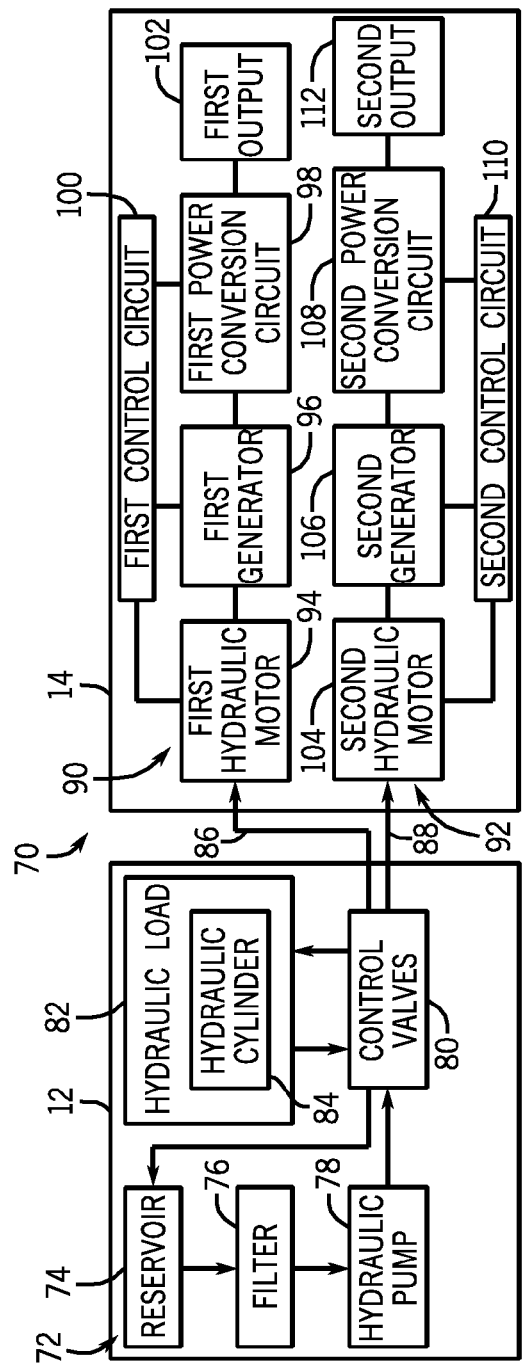
FIG. 2 is a block diagram illustrating an embodiment of a welding system including a hydraulically driven dual operator welding power supply that receives hydraulic power from a hydraulic system disposed in a work vehicle.

FIG. 2 is a block diagram illustrating an embodiment of a welding system 70 in which the hydraulically driven welding power supply 14 receives hydraulic power from a hydraulic system 72 disposed in the work vehicle 12. In this embodiment, the work vehicle 12 includes the hydraulic system 72 that includes a reservoir 74, a filter 76, a hydraulic pump 78, control valves 80, and a hydraulic load 82 that includes a hydraulic cylinder 84. The hydraulic system 72 outputs hydraulic power, which may be split into a first hydraulic power output and a second hydraulic power output, as illustrated by arrows 86 and 88, respectively.

The hydraulically driven power supply 14 configured as a dual operator unit includes a first power production pathway 90 and a second power production pathway 92. The first pathway 90 includes a first hydraulic motor 94, a first generator 96, a first power conversion circuit 98, and a first control circuit 100 that cooperate to produce a first power output 102. The second pathway 92 includes a second hydraulic motor 104, a second generator 106, a second power conversion circuit 108, and a second control circuit 110 that cooperate to produce a second power output 112. As such, the hydraulically driven welding power supply 14 includes components capable of producing both the first power output 102 and the second power output 112, each of which may be utilized by a separate welding operator at the same time. That is, the illustrated hydraulically driven welding power supply 14 supports two welding operations by producing two separate outputs 102 and 112. However, it should be noted that in other embodiments, additional power outputs may support any number of additional welding operations.

During operation, the hydraulic system 72 of the work vehicle 12 operates to produce hydraulic power to power operations of the work vehicle 12 and to power the hydraulically driven welder 14. To that end, the reservoir 74 houses a hydraulic fluid, such as water, mineral oil, biodegradable fluid (e.g., vegetable oil based compounds), and so forth, capable of being utilized to transfer power between components of the system. During one operational path, the hydraulic fluid is transferred from the reservoir 74 to the hydraulic pump 78 through the filter 76. The filter 76 removes one or more particulates that are deemed contaminants of the hydraulic fluid. The hydraulic pump 78 is configured to supply a regulated flow of the filtered hydraulic fluid to components of the hydraulic system 72. Based on the given application, the hydraulic pump 78 may be any of a variety of suitable types of pumps, such as hydrostatic or hydrodynamic pumps, fixed displacement or variable displacement pumps, and so forth.

The control valves 80 are configured to route the hydraulic fluid to and from the desired actuator (e.g., the hydraulic cylinder 84) and the reservoir 74. For example, in one embodiment, the control valves 80 may be directional control valving made of a spool disposed in a housing. In such an embodiment, the spool may alternate between predefined positions within the housing to create channels that direct the hydraulic fluid along the desired path toward the desired actuator or the reservoir. For example, the spool may be positioned in a neutral position, which blocks fluid flow to the hydraulic load 82 and routes the fluid back to the reservoir 74. For further example, the spool may be further slid to another position to route the hydraulic fluid to the hydraulic load 82 and to provide a return path from the hydraulic load 82 to the reservoir 74.

In one embodiment, the hydraulic load 82 may be the hydraulic cylinder 84. In such an embodiment, the hydraulic cylinder 84 operates as a mechanical actuator based on the pressure of the hydraulic fluid flowing therethrough. Once the hydraulic fluid is utilized by the hydraulic cylinder 84, a piston of the hydraulic cylinder 84 forces the used hydraulic fluid back to the control valves 80 that route the used hydraulic fluid back to the reservoir 74 for further use. As such, the hydraulic system 72 of the work vehicle 12 utilizes hydraulic fluid to produce power for the work vehicle operation as well as to generate the hydraulic power outputs 86 and 88 for use in the hydraulically driven welding power supply 14.

It should be noted that although a single hydraulic circuit 72 is shown in the illustrated embodiment, any suitable hydraulic circuit may be utilized by the work vehicle 12 to produce hydraulic power. That is, any of a variety of hydraulic circuits may be employed in conjunction with the systems disclosed herein. For example, the hydraulic circuit may be open looped or closed looped depending on the given application. Still further, in some embodiments, the entire hydraulic circuit may not be located in a work vehicle 12. Instead, in such embodiments, the hydraulic circuitry may be located in part or entirely in the welding power supply 14.

Returning to the embodiment illustrated in FIG. 2, the first hydraulic power output 86 is received by the first hydraulic motor 94 in the welding power supply 14. The first hydraulic motor 94 operates to harness hydraulic pressure and flow to power rotation of the first generator 96. The first generator 96 rotates to generate power, which is received by the first power conversion circuitry 98. The first power conversion circuitry 98 converts the generator output to produce the first output 102 at a level and type of power appropriate for the given application. Operation of the hydraulic motor 94, the generator 96, and the conversion circuitry 98 is controlled by the first control circuit 100. For example, the control circuit 100 communicates control commands, such as desired shaft rotation speeds, desired power output levels, desired type of power output (e.g., direct current), and so forth, to such components to guide the operation to achieve the desired output.

Likewise, the second power production pathway 92 operates in a similar manner to that of the first power production pathway 90 to generate the second power output 112. As before, the second hydraulic power output 88 from the work vehicle 12 is received by the second hydraulic motor 104 that drives rotation of the second generator 106 to produce electrical energy. The electrical power produced by the second generator 106 is routed through the second power conversion circuitry 108, which converts the incoming power to the second output 112 at an appropriate level and type of power. Again, as with the first power production pathway 90, the level and type of the second output 112 is regulated via control of the motor 104, the generator 106, and the conversion circuit 108 by the second control circuit 110.

Figure 3:
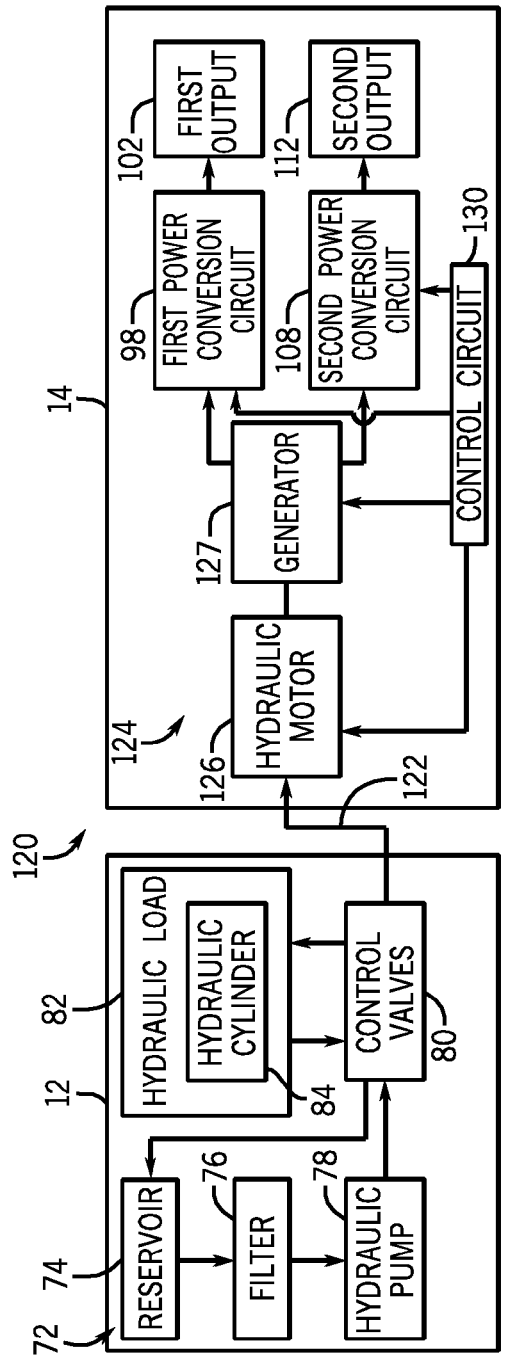
FIG. 3 is a block diagram illustrating an embodiment of the welding system of FIG. 2 in which the hydraulically driven welding power supply includes a single hydraulic motor adapted to produce two power outputs.

FIG. 3 is a block diagram illustrating an embodiment of a welding system 120 in which the hydraulically driven welding power supply 14 includes shared components. In this embodiment, the hydraulic system 72 disposed in the work vehicle 12 operates as described above in FIG. 2 to produce hydraulic power for operation of the work vehicle. As before, hydraulic power, as represented by arrow 122, is received by the welding power supply 14 from the work vehicle 12. However, in this embodiment, a single power production circuit 124 is provided in the welding power supply 14. The power production circuit 124 includes a hydraulic motor 126, a generator 127, the first power conversion circuit 98, the second power conversion circuit 108, a control circuit 130, the first power output 102, and the second power output 112. As such, in this embodiment, a single power production circuit 124 supplies both power outputs 102 and 112.

During operation of the power production circuit 124, the hydraulic motor 126 receives the incoming hydraulic power 122 and utilizes such power to drive the generator 127. The generator 127 is configured to provide a first power output to the first power conversion circuit 98 and to provide a second power output to the second power conversion circuit 108. As such, in one embodiment, the single generator unit 127 may include two distinct stators having separate cores and windings each configured to provide a separate power output. In another embodiment, the generator 127 may include a single stator with distinct windings each capable of supporting a separate welding arc. However, in such embodiments, the generator 127 provides power to both the first power conversion circuit 98 as well as to the second power conversion circuit 108, which condition the incoming power to produce the first power output 102 and the second power output 112, respectively. In the illustrated embodiment, a single control circuit 130 functions to control the operation of the pathway 124 to produce two separate and distinct power outputs 102 and 112. To that end, the control circuit 130 may be capable of controlling the generator 127, the first power conversion circuit 98, and the second power conversion circuit 108. However, it should be noted that in further embodiments, any appropriate number of control circuits may be provided to control operation of the power production pathway 124.

In the embodiments of FIGS. 2 and 3, the first power output 102 and the second power output 112 are illustrated as two separate outputs. However, in some embodiments, the two outputs may be combined into a single higher power output. For example, some high power welding operations, for example, gouging, may require a high power output. In such instances, either via manual adjustment of the power supply mode or via automatic determination by the appropriate control circuitry, the power supply may couple the outputs to meet the demand. In such instances, the power supply may still revert back to two separate and distinct power outputs after the high power event is no longer occurring.

Figure 4:
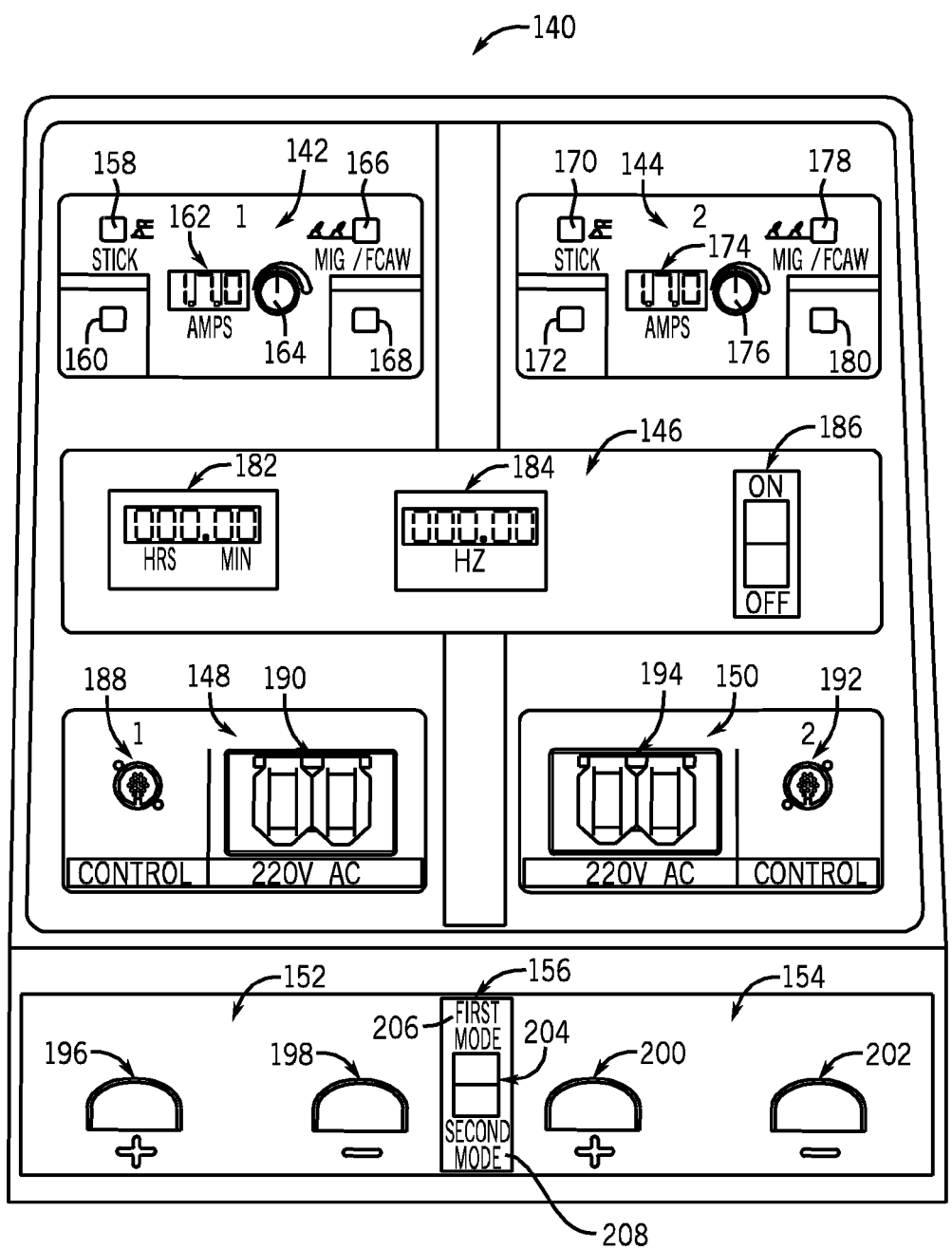
FIG. 4 illustrates an exemplary control panel that may be located on the hydraulically driven, dual operator welding power source of FIG. 1 in accordance with embodiments of the present invention.

FIG. 4 illustrates an exemplary control panel 140 that may be located on the hydraulically driven, dual operator welding power source of FIG. 1 in some embodiments. As such, the control panel 140 includes a variety of control selectors, buttons, knobs, and so forth, which may be repeated twice, once for control of each distinct welding operation. That is, the control panel 140 may provide two sets of substantially identical controls each configured for use by either a first operator to control parameters of the first welding operation or for use by a second operator to control parameters of the second welding operation. As such, embodiments of the present invention may include a single control panel that provides control capabilities for two distinct welding operations. It should be noted, however, that in further embodiments, separate control panels for each welding operation may be provided on the hydraulically driven power source.

Turning now to the illustrated embodiment, the control panel 140 includes a first process selection panel 142, a second process selection panel 144, a user interface panel 146, a first receptacle panel 148, a second receptacle panel 150, a first terminal panel 152, a second terminal panel 154, and a switch panel 156. The first process selection panel 142 includes a stick selection button 158, an electrode type selection button 160, an amperage display 162, an adjustment knob 164, a metal inert gas (MIG)/flux cored arc welding (FCAW) button 166, and a flux core type button 168. Similarly, the second process selection panel 144 includes a stick selection button 170, an electrode type selection button 172, an amperage display 174, an adjustment knob 176, a MIG/FCAW button 178, and a flux core type button 180.

The user interface panel 146 includes a time log display 182, a frequency display 184, and a main power switch 186. The first receptacle panel 148 includes a remote control receptacle 188 and a duplex outlet 190. The second receptacle panel 150 includes a remote control receptacle 192 and a duplex outlet 194. The first terminal panel 152 includes a positive output terminal 196 and a negative output terminal 198. Similarly, the second terminal panel 154 includes a positive output terminal 200 and a negative output terminal 202. The switch panel 156 includes a switch 204, a first mode position 206, and a second mode position 208.

During operation, the first process selection panel 142 enables a first operator to control the welding process for the first welding operation, and the second process selection panel 144 enables a second operator to control the welding process for the second welding operation. For example, the first welding operator may utilize the selection buttons 158 and 166 to communicate the desired welding process (e.g., MIG welding, flux cored arc welding (FCAW), etc.) to the welding power supply. The first welding operator may then utilize the buttons 160 and 168 to communicate the desired electrode type to the power supply. Further, the first welding operator may utilize the knob 164 to adjust the amperage of the welding process, as shown on amperage display 162. Similarly, the second operator may utilize the buttons 170 and 178 to indicate the desired welding process and the buttons 172 and 180 to indicate the electrode type. Further, the second operator may utilize knob 176 and display panel 174 to adjust the amperage to a desired set point.

The user interface panel 146 may be utilized by one or both of the welding operators to receive and input general power supply status information. For example, either operator may power the hydraulic power supply ON or OFF with power switch 186. Further, when the power supply is powered ON, the time log display 182 may be configured to communicate the amount of time that the generator has been in use. Similarly, the frequency meter display communicates the generator output frequency to the one or more operators. As such, the user interface panel 146 may include buttons, displays, selectors, and so forth, which may include controls or information applicable to both welding operations. Although the illustrated user interface includes two displays and one switch, additional embodiments may include any suitable number of logs, displays, or switches, as would be deemed advantageous to one skilled in the art.

The first receptacle panel 148 and the second receptacle panel 150 provide receptacles for one or more welding devices configured for use in the first welding operation and the second welding operation, respectively. For example, outlet 188 may receive a connector coupled to a remote device configured for use in the first welding operation. For further example, duplex outlet 194 may be configured to receive a welding device capable of operating off of 220V alternating current (AC) power and configured for use in the second welding operation.

Still further, the first terminal panel 152 and the second terminal panel 154 provide positive and negative output terminal connections 196 and 198 or 200 and 202 for utilization by the operator of the first welding process and the operator of the second welding process, respectively. Additionally, the switch 204 located on the switch panel 156 may be utilized by either operator to place the hydraulically driven welding power supply in a first mode 206 of operation or a second mode 208 of operation. For example, in one embodiment, the first mode 206 of operation may be an independent operation mode. In the independent operation mode, the hydraulically driven welding power supply 14 is capable of simultaneously supporting two separate and distinct welding outputs, as described in detail above. For further example, the second mode 208 of operation may be a parallel operation mode in which the two outputs produced by the welding power supply may be combined to produce a single higher output (e.g., for gouging operations). When placed in such a mode, the hydraulically driven welding power supply is configured to output only one higher welding output. It should be noted that when placed in the parallel operation mode, either the first set of studs 196 and 198 or the second set of studs 200 and 202 may support the higher welding output. Additionally, in some embodiments, an additional knob or switch may be provided that allows an operator to choose either the first set of studs (196 and 198) or the second set of studs (200 and 202) as the active set of studs capable of supporting the single high power output. However, via movement of the switch back to the first mode 206 position, the welding power supply may be re-enabled for dual operator welding.

FIG. 5 illustrates an exemplary pipe welding system 220 including the exemplary semicircular frame structure 40 positioned on the workpiece (e.g., the pipe 20). The illustrated pipe welding system 220 includes the extension 38, which may be supported by a hook of the crane extending from a work vehicle, as shown in FIG. 1. The extension 38 is coupled to the semicircular bars 42, 44, 46, and 48 that fit partially around the circumference of the pipe 20. The semicircular bars 42, 44, 46, and 48 include adjustable feet 50, 52, 54, and 56 that are configured to adjust to stabilize the frame 40 based on the size of the pipe 20. Further, the semicircular bars 44 and 46 provide support for and terminate in the first wire feeder 22 and the second wire feeder 24, respectively.

In the illustrated embodiment, exemplary features of the first wire feeder 22 are shown in detail. Specifically, a welding torch 222 is coupled to the first wire feeder 22 via a first cable 224. Additionally, a second cable 226 and a third cable 228 couple the wire feeder 22 to an electrode outlet and a ground outlet located on the hydraulically driven dual operator welding power supply 14, which may be located on a work vehicle. The first wire feeder 22 also includes a control panel 230 that enables a user to set wire feed speed, choose one or more advanced processes, set parameters of a chosen advanced process, and so forth, as described in more detail below with respect to FIG. 6. Although such features are not shown on the second wire feeder 24 in the illustrated embodiment, it should be noted that in certain embodiments, the first wire feeder 22 and the second wire feeder 24 are substantially identical in structure and function.

During operation, the first wire feeder 22 is adapted to rotate and pivot, as indicated by arrows 232 and 234, to facilitate welding in multiple positions as desired by the operator. In the illustrated embodiment, the wire feeder 22 supplies the illustrated welding torch 222 with weld power and a wire feed sufficient to support the given welding application. Similarly, the second wire feeder 24 may also supply another welding torch with weld power and wire for a second welding operation. Since the first wire feeder 22 and the second wire feeder 24 are disposed on opposite sides of the pipe 20 in the illustrated embodiment, it may be possible for the dual operations to cooperate to complete a weld around the entire circumference of the pipe 20. However, in other embodiments, the first wire feeder 22 and the second wire feeder 24 may also be configured to support two separate, unrelated welding operations. However, both welding operations performed with separate torches coupled to each wire feeder are still supported by a single hydraulically driven welding power supply 14, as described in detail above.

FIG. 6 illustrates an exemplary control panel 240 that may be located on one or more of the first wire feeder 22 and the second wire feeder 24 of FIG. 5. Again, it should be noted that in some embodiments, substantially identical control panels may be located on each of the wire feeders 22 and 24 to facilitate individual control of the wire feed properties associated with each of two separate welding operations. Further, in other embodiments, the control panels of the first wire feeder 22 and the second wire feeder 24 may differ, for example, by each providing the functions and capabilities desired for their respective welding operation.

The illustrated control panel 240 includes a basic user interface panel 242 and an advanced process panel 244. The basic user interface panel 242 includes a wire feed speed display 246, a feed speed increase button 248, a feed speed decrease button 250, a jog button 252, a purge button 254, a voltage display 256, a voltage increase button 258, a voltage decrease button 260, a trigger hold OFF button 262, and a trigger hold ON button 264. The advanced process panel 244 includes a MIG type button 266, a MIG wire diameter button 268, a FCAW type button 270, and a gas type button 272.

During operation, the operator may utilize the user interface panel 242 to set parameters of the wire feed process. For example, if the operator desires an increase in the wire feed speed, the operator may depress button 248 and monitor the display 246 until the indicated speed is at the desired level. Similarly, if the operator desires a decrease in the wire feed speed, for example, if the speed has been increased above the desired level, the operator may depress button 250 to achieve the desired speed. Further, the operator may depress the jog button 252 to activate the wire drive motor to establish an initial feed of wire, for example, after a new wire spool has been installed in the wire feeder. Still further, the operator may depress the purge button 254 to remove air from the lines and fill such lines with shielding gas, for example, prior to the start of a new welding operation after replacement of an empty gas cylinder.

The voltage display 256 is configured to display a voltage of the welding process to the operator when in use. The user may utilize the buttons 258 and 260 to increase or decrease the voltage set point of the welding process throughout use. Further, the trigger hold buttons 262 and 264 allow an operator to designate whether or not continuous trigger activation is desired throughout the welding process. For example, if the welding operation being performed is of a long duration, the operator may depress button 262 such that the torch trigger need not be depressed throughout the operation to maintain a wire feed. However, if the welding operation being performed is of a short duration, the operator may depress button 264 such that the trigger of the welding torch must be depressed to establish a wire feed. Such a feature may reduce operator fatigue as compared to systems without trigger hold capabilities.

Still further, during use, the advanced process panel 244 may be utilized by an operator to specify a variety of parameters of the wire feed process. For example, if the user is performing a MIG welding process, the user may utilize the button 266 to indicate the type of wire being used, for example, solid or metal cored wire. Further, the user may also specify the diameter of the wire being utilized in the MIG welding process via button 268. For further example, if the user is performing a FCAW process, the user may utilize button 270 to specify whether the flux itself is being utilized to shield the welding process from contaminants or whether a shielding gas is desired. Additionally, if the FCAW process is a gas shielded process, the user may specify the desired gas type via button 272.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a hydraulically driven welding power supply configured to utilize hydraulic primary power to generate a first welding output for a first welding operation and a second welding output for a second welding operation; and
control circuitry coupled to the hydraulically driven welding power supply and configured to enable the hydraulically driven welding power supply to provide the first welding output and the second welding output at the same time to enable a first welding operator and a second welding operator to perform the first welding operation and the second welding operation, respectively, at the same time;
wherein the hydraulically driven welding power supply comprises a control panel, and the control panel is configured to enable the first welding operator to control the first welding operation and to enable the second welding operator to control the second welding operation;
wherein the control panel comprises a first process control panel configured to enable the first welding operator to set welding parameters for the first welding operation, and a second process control panel configured to enable the second welding operator to set welding parameters for the second welding operation; and
wherein the first process control panel comprises a first stick selection button, a first electrode type selection button, a first amperage display, a first adjustment knob, a first metal inert gas (MIG)/flux cored arc welding (FCAW) button, a first flux core type button, or any combination thereof, and the second process control panel comprises a second stick selection button, a second electrode type selection button, a second amperage display, a second adjustment knob, a second MIG/FCAW button, and a second flux core type button, or any combination thereof.

2. The welding system of claim 1, wherein the hydraulically driven welding power supply is disposed on a work vehicle, and the hydraulic primary power is received by the hydraulically driven welding power supply from the work vehicle.

3. The welding system of claim 2, wherein the work vehicle comprises an extension removably coupled to a semicircular frame, and the semicircular frame is configured to partially surround a portion of a circumference of a pipe.

4. The welding system of claim 3, comprising a first wire feeder disposed at a first end portion of the semicircular frame, wherein the first wire feeder is coupled to the hydraulically driven welding power supply, and the first wire feeder is configured to provide a first wire feed for the first welding operation.

5. The welding system of claim 4, comprising a second wire feeder disposed at a second end portion of the semicircular frame, wherein the second wire feeder is coupled to the hydraulically driven welding power supply, and the second wire feeder is configured to provide a second wire feed for the second welding operation.

6. The welding system of claim 1, wherein the control panel comprises a mode switch configured to enable a user to place the hydraulically driven welding power supply in an independent operation mode and in a parallel operation mode.

7. The welding system of claim 1, wherein the control panel comprises a first positive outlet and a first negative outlet dedicated to welding leads for the first welding operation, and a second positive outlet and a second negative outlet dedicated to welding leads for the second welding operation.

8. A welding system comprising:
   a hydraulically driven welding power supply configured to provide first and second welding outputs at the same time for first and second welding operations, respectively, comprising:
      a housing;
      a hydraulic motor configured to be driven by hydraulic power received by the hydraulically driven welding power supply;
      a generator configured to be driven by the hydraulic motor to generate power;
      a first power conversion circuit configured to convert the generated power into the first welding output for a first welding operation; and
      a second power conversion circuit configured to convert the generated power into the second welding output for a second welding operation, wherein the hydraulic motor, the generator, the first power conversion circuit, and the second power conversion circuit are disposed in the housing; and
   a control panel configured to enable welding parameters to be set for the first welding operation and the second welding operation, wherein the control panel comprises a first process control panel configured to enable a first operator to set welding parameters for the first welding operation, and a second process control panel configured to enable a second operator to set welding parameters for the second welding operation, and wherein the first process control panel comprises a first stick selection button, a first electrode type selection button, a first amperage display, a first adjustment knob, a first metal inert gas (MIG)/flux cored arc welding (FCAW) button, a first flux core type button, or any combination thereof, and the second process control panel comprises a second stick selection button, a second electrode type selection button, a second amperage display, a second adjustment knob, a second MIG/FCAW button, and a second flux core type button, or any combination thereof; and
   a controller coupled to the hydraulically driven welding power supply and configured to control the hydraulically driven welding power supply to exclusively activate the first welding output, to exclusively activate the second welding output, or to concurrently activate both the first welding output and the second welding output based on input received from the control panel.

9. The welding system of claim 8, wherein the controller is configured to activate an independent operation mode during which the controller controls the hydraulically driven welding power supply to independently output, at the same time, the first welding output and the second welding output for use in the first welding operation and the second welding operation, respectively, by two distinct operators.

10. The welding system of claim 8, wherein the controller is configured to activate a parallel operation mode during which the controller controls the hydraulically driven welding power supply to combine the first welding output and the second welding output to provide a single high welding output.

11. The welding system of claim 8, wherein the hydraulically driven welding power supply is configured to receive the hydraulic power from a hydraulic system comprising a fluid reservoir and a hydraulic pump.

12. The welding system of claim 11, wherein the hydraulic system is located in a work vehicle configured to utilize the hydraulic system to generate the hydraulic power received by the hydraulically driven welding power supply.

\* \* \* \* \*